United States Patent
Bachmann

(10) Patent No.: US 11,866,027 B2
(45) Date of Patent: Jan. 9, 2024

(54) METHOD FOR REGULATING A KINEMATIC VARIABLE OF A MOTOR VEHICLE

(71) Applicant: Robert Bosch GmbH, Stuttgart (DE)

(72) Inventor: Michael Bachmann, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 227 days.

(21) Appl. No.: 17/150,670

(22) Filed: Jan. 15, 2021

(65) Prior Publication Data
US 2021/0229652 A1 Jul. 29, 2021

(30) Foreign Application Priority Data

Jan. 27, 2020 (DE) .......................... 102020200908.2

(51) Int. Cl.
*B60W 10/04* (2006.01)
*B60W 50/00* (2006.01)

(52) U.S. Cl.
CPC ............ *B60W 10/04* (2013.01); *B60W 50/00* (2013.01); *B60W 2050/0043* (2013.01); *B60W 2520/105* (2013.01)

(58) Field of Classification Search
CPC ................. B60W 10/04; B60W 50/00; B60W 2050/0043; B60W 2520/105; B60W 30/18109; B60W 2050/0006; B60W 2050/0011; B60W 2720/106; B60W 40/105; B60W 40/107; B60W 40/109; B60W 2520/10; B60W 2520/12
USPC ............................................................. 701/1
See application file for complete search history.

(56) References Cited

U.S. PATENT DOCUMENTS

| | | | |
|---|---|---|---|
| 2005/0085984 A1* | 4/2005 | Uhler ..................... | B60W 10/18 701/93 |
| 2008/0051969 A1* | 2/2008 | Demaya ............... | G05B 13/024 701/79 |
| 2011/0133106 A1* | 6/2011 | Grossmann ............ | F02D 41/10 251/305 |

(Continued)

FOREIGN PATENT DOCUMENTS

| | | |
|---|---|---|
| DE | 102016204356 A1 | 9/2017 |
| WO | 2004045898 A2 | 6/2004 |

*Primary Examiner* — Jonathan M Dager
*Assistant Examiner* — Jean W Charleston
(74) *Attorney, Agent, or Firm* — NORTON ROSE FULBRIGHT US LLP; Gerard A. Messina

(57) ABSTRACT

A method for regulating a kinematic variable of a motor vehicle. The method includes: receiving actual value signals, which represent an actual value of a kinematic variable of a motor vehicle; receiving setpoint signals, which represent a setpoint value of the kinematic variable; ascertaining an actuating variable to be implemented by one or multiple actuating element(s) of the motor vehicle, based on the actual value, the setpoint value and a variation of the setpoint value over time in such a way that a deviation between the actual value and the setpoint value becomes smaller when the actuating variable is implemented with the aid of the one or multiple actuating element(s); and outputting actuating variable signals, which represent the ascertained actuating variable. A device, a computer program, and a machine-readable memory medium are also described.

22 Claims, 5 Drawing Sheets

(56) References Cited

U.S. PATENT DOCUMENTS

| | | | |
|---|---|---|---|
| 2011/0144865 A1* | 6/2011 | Niemz | B62D 15/0285 701/41 |
| 2011/0264341 A1* | 10/2011 | Heyl | B60L 15/20 701/53 |
| 2013/0306027 A1* | 11/2013 | Tobail | F02D 41/22 123/349 |
| 2015/0162856 A1* | 6/2015 | Kaufmann | B60T 13/741 318/400.09 |
| 2015/0175158 A1* | 6/2015 | Wagner | B60W 30/14 701/1 |
| 2015/0239438 A1* | 8/2015 | Bohm | B60T 7/042 701/70 |
| 2016/0137178 A1* | 5/2016 | Böhm | H01F 7/064 701/70 |

* cited by examiner

METHOD FOR REGULATING A KINEMATIC VARIABLE OF A MOTOR VEHICLE

FIELD

The present invention relates to a method for regulating a kinematic variable of a motor vehicle. The present invention further relates to a device, a computer program and a machine-readable memory medium.

BACKGROUND INFORMATION

German Patent Application No. DE 10 2016 204 356 A1 describes a method and a device for the longitudinal regulation of a motor vehicle.

PCT Application No. WO 2004/045898 A2 describes a method and a device for regulating the vehicle longitudinal acceleration.

SUMMARY

An object of the present invention is to provide efficient regulation of a kinematic variable of a motor vehicle.

This object may be achieved with the aid of example embodiments of the present invention. Advantageous embodiments of the present invention are described herein.

According to a first aspect of the present invention, a method for regulating a kinematic variable of a motor vehicle is provided, which includes the following steps:

Receiving actual value signals, which represent an actual value of a kinematic variable of a motor vehicle;

Receiving setpoint signals, which represent a setpoint value of the kinematic variable;

Ascertaining an actuating variable to be implemented by one or multiple actuating element(s) of the motor vehicle, based on the actual value, the setpoint value and a variation of the setpoint value over time in such a way that a deviation between the actual value and the setpoint value becomes smaller when the actuating variable is implemented with the aid of the one or multiple actuating element(s);

Outputting actuating variable signals, which represent the ascertained actuating variable.

According to a second aspect of the present invention, a device is provided, which is configured to carry out all steps of the method according to the first aspect of the present invention.

According to a third aspect of the present invention, a computer program is provided, which includes commands, which, when the computer program is executed by a computer, for example by the device according to the second aspect, prompt the latter to carry out a method according to the first aspect.

According to a fourth aspect of the present invention, a machine-readable memory medium is provided, on which the computer program according to the third aspect is stored.

The present invention is based on and includes the finding that the above object is achievable in that the variation of the setpoint value over time is taken into account in the form of an additional contribution to the actuating variable. A second-order setpoint value subsequent behavior (curvature behavior) is advantageously efficiently improved thereby. A controller stability and an asymptotic adjustment behavior is advantageously not negatively affected.

Since the actual value of the control variable is not incorporated into a calculation of the additional component, no increase of interference and noise amplitudes on the actuating variable advantageously takes place.

The technical advantage is advantageously effectuated thereby that the kinematic variable of the motor vehicle may be efficiently regulated.

According to one specific embodiment of the present invention, the kinematic variable is an element selected from the following group of kinematic variables: velocity, in particular transverse velocity, in particular longitudinal velocity, acceleration, in particular transverse acceleration, in particular longitudinal acceleration.

According to one specific embodiment of the present invention, it is provided that multiple kinematic variables of the motor vehicle are regulated. This means, in particular, that, when the singular is used for the kinematic variable, it should always be read to mean the plural and vice versa.

According to one specific embodiment of the present invention, it is provided that multiple partial actuating variables are ascertained in each case, based on the actual value and/or the setpoint value and/or the variation of the setpoint value over time, at least one of the multiple partial actuating variables being ascertained based on the variation of the setpoint value over time, the actuating variable being ascertained based on the multiple partial actuating variables.

For example, the technical advantage is effectuated thereby that the actuating variable may be efficiently ascertained. In particular, the technical advantage is effectuated thereby that, for example, dynamizing and/or damping properties may be weighted differently thereby.

According to one specific embodiment of the present invention, it is provided that the actuating variable is equal to the sum of the multiple partial actuating variables.

According to one specific embodiment of the present invention, it is provided that the partial actuating variables are provided with weighting factors, so that they are differently weighted.

For example, it is provided that the actuating variable is equal to the sum of the weighted partial actuating variables.

According to one specific embodiment of the present invention, it is provided that a control difference between the actual value and the setpoint value is ascertained, one of the multiple partial actuating variables being ascertained based on a time integration of the ascertained control difference.

For example, the technical advantage is effectuated thereby that the actuating variable may be efficiently ascertained.

According to this specific embodiment of the present invention, it is thus provided that the regulation includes an integral component (I component).

According to one specific embodiment of the present invention, it is provided that a control difference between the actual value and the setpoint value is ascertained, one of the multiple partial actuating variables being ascertained in such a way that it is proportional to the ascertained control difference.

For example, the technical advantage is effectuated thereby that the actuating variable may be efficiently ascertained.

This means, in particular, that, according to this specific embodiment, the regulation includes a proportional component (P component).

According to one specific embodiment of the present invention, it is provided that one of the multiple partial actuating variables is ascertained in such a way that it is proportional to the setpoint value.

For example, the technical advantage is effectuated thereby that the actuating variable may be efficiently ascertained.

According to this specific embodiment of the present invention, it is thus provided that the regulation includes a proportional pilot control.

According to one specific embodiment of the present invention, it is provided that multiple differential partial actuating variables are ascertained in each case, based on the actual value and/or the setpoint value and/or the variation of the setpoint value over time, at least one of the multiple differential partial actuating variables being ascertained based on the variation of the setpoint value over time, a differential actuating variable being ascertained based on the multiple differential partial actuating variables, the actuating variable being ascertained based on a time integration of the differential actuating variable.

For example, the technical advantage is effectuated thereby that the actuating variable may be efficiently ascertained.

According to this specific embodiment of the present invention, it is thus provided that the regulation includes a differential formulation.

For example, the technical advantage is thus effectuated thereby that, due to this differential formulation or representation, the different partial regulations may be added and/or removed during an active regulation, and the weighting and amplifications therefore may be varied without affecting a continuity of the actuating variable or its absolute value.

According to one specific embodiment of the present invention, it is provided that a control difference between the actual value and the setpoint value is ascertained, one of the multiple differential partial actuating variables being ascertained based on the ascertained control difference.

For example, the technical advantage is effectuated thereby that the actuating variable may be efficiently ascertained.

This means, in particular, that, according to this specific embodiment of the present invention, the regulation includes an integral component (I component).

According to one specific embodiment of the present invention, it is provided that a variation of a control difference between the actual value and the setpoint value over time is ascertained, one of the multiple differential partial actuating variables being ascertained in such a way that it is proportional to the ascertained variation of the control difference over time.

For example, the technical advantage is effectuated thereby that the actuating variable may be efficiently ascertained.

This means, in particular, that, according to this specific embodiment, it is provided that the regulation includes a proportional component (P component).

According to one specific embodiment of the present invention, it is provided that one of the multiple differential partial actuating variables is ascertained in such a way that it is proportional to the variation of the setpoint value over time.

For example, the technical advantage is effectuated thereby that the actuating variable may be efficiently ascertained.

According to this specific embodiment of the present invention, it is thus provided that the regulation includes a proportional pilot control.

According to one specific embodiment of the present invention, it is provided that a variation over time of the variation of the setpoint value over time is ascertained, one of the multiple differential partial actuating variables being ascertained based on the ascertained variation over time of the variation of the setpoint value over time.

For example, the technical advantage is effectuated thereby that the actuating variable may be efficiently ascertained.

According to this specific embodiment of the present invention, it is thus provided that the regulation includes a differential pilot control.

The fact that the actuating variable is ascertained, among other things, based on a variation of the setpoint value over time means, in particular, that the regulation includes a differential pilot control.

According to one specific embodiment of the present invention, it is provided that a control difference between the actual value and the setpoint value is ascertained.

According to one specific embodiment of the present invention, it is provided that a variation over time of a control difference between the actual value and the setpoint value is ascertained.

According to one specific embodiment of the present invention, it is provided that a variation over time of the variation of the setpoint value over time is ascertained.

A variation over time is thus, in particular, a first-order time derivation.

A variation over time of the variation over time is thus, in particular, a second-order time derivation.

According to one specific embodiment of the present invention, it is provided that the wording "a deviation between the actual value and the setpoint value becomes smaller" includes the case that a deviation between the actual value and the setpoint value assumes a minimum value.

This means, in particular that, according to one specific embodiment of the present invention, it is provided that the wording "a deviation between the actual value and the setpoint value becomes smaller" is replaced by the wording "a deviation between the actual value and the setpoint value assumes a minimum value."

The wording "smaller" is to be viewed, in particular, as relative to the instantaneous deviation.

According to one specific embodiment of the present invention, it is provided that an actuating element is an actuating element of the drive system or the clutch system or the steering system or the braking system of the motor vehicle, respectively.

One actuating element is, for example, a brake.

One actuating element is, for example, an engine.

According to one specific embodiment of the present invention, actuating variable S is illustrated or represented by a force, in particular a transverse or longitudinal force, which is or is to be applied, for example, by suitable actuators (brake, drive train) and effectuates, for example, an acceleration at the motor vehicle, in particular a transverse or longitudinal acceleration.

According to one specific embodiment of the present invention, it is provided that the method according to the first aspect is a computer-implemented method.

According to one specific embodiment of the present invention, it is provided that the method according to the first aspect is executed or carried out with the aid of the device according to the second aspect.

Technical functionalities of the device according to the second aspect similarly result from corresponding technical functionalities of the method according to the first aspect and vice versa.

This means, in particular, that device features result from corresponding method features and vice versa.

The wording "respectively" stands for, in particular, "and/or."

Exemplary embodiments of the present invention are shown in the figures and are explained in greater detail below.

BRIEF DESCRIPTION OF THE DRAWINGS

The same reference numerals may be used below for the same features.

DETAILED DESCRIPTION OF EXAMPLE EMBODIMENTS

Figure 1:
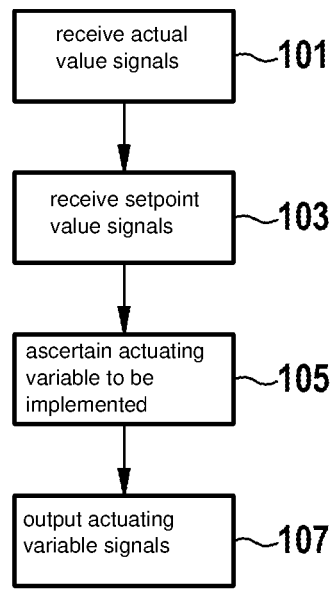
FIG. 1 shows a flowchart of an example method according to a first aspect of the present invention.

FIG. 1 shows a flowchart of a method for regulating a kinematic variable of a motor vehicle in accordance with an example embodiment of the present invention.

The example method includes the following steps:

Receiving 101 actual value signals, which represent an actual value of a kinematic variable of a motor vehicle;

Receiving 103 setpoint value signals, which represent a setpoint value of the kinematic variable;

Ascertaining 105 an actuating variable to be implemented by one or multiple actuating element(s) of the motor vehicle, based on the actual value, the setpoint value and a variation of the setpoint value over time in such a way that a deviation between the actual value and the setpoint value becomes smaller when the actuating variable is implemented with the aid of the one or multiple actuating element(s);

Outputting 107 actuating variable signals, which represent the ascertained variable.

Figure 2:
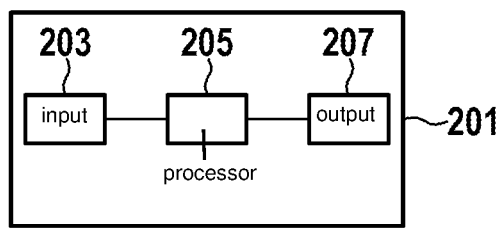
FIG. 2 shows an example device according to the second aspect of the present invention.

FIG. 2 shows a device 201.

Device 201 is configured to carry out all steps of the method according to the first aspect.

Device 201 includes an input 203, which is configured to receive actual value signals which represent an actual value of a kinematic variable of a motor vehicle.

Input 203 is configured to receive setpoint value signals which represent a setpoint value of the kinematic variable.

Device 201 includes a processor 205, which is configured to ascertain an actuating variable to be implemented by one or multiple actuating element(s) of the motor vehicle, based on the actual value, the setpoint value and a variation of the setpoint value over time, in such a way that a deviation between the actual value and the setpoint value becomes smaller when the actuating variable is implemented with the aid of the one or multiple actuating element(s).

Processor 205 is configured, in particular, to generate actuating variable signals which represent the ascertained actuating variable.

Device 201 includes an output 207, which is configured to output actuating variable signals which represent the ascertained actuating variable.

According to one specific embodiment, it is provided that an actuating element is an actuating element of the drive system or the clutch system or the steering system or the braking system of the motor vehicle, respectively.

One actuating element is, for example, a brake.

One actuating element is, for example, an engine.

Figure 3:
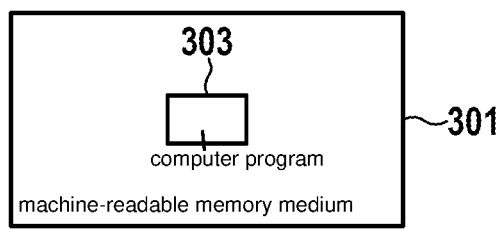
FIG. 3 shows an example machine-readable memory medium according to the fourth aspect of the present invention.

FIG. 3 shows a machine-readable memory medium 301.

A computer program 303 is stored on machine-readable memory medium 301. Computer program 303 includes commands, which, when the computer program is executed by a computer, prompt the latter to carry out the method according to the first aspect.

Figure 4:
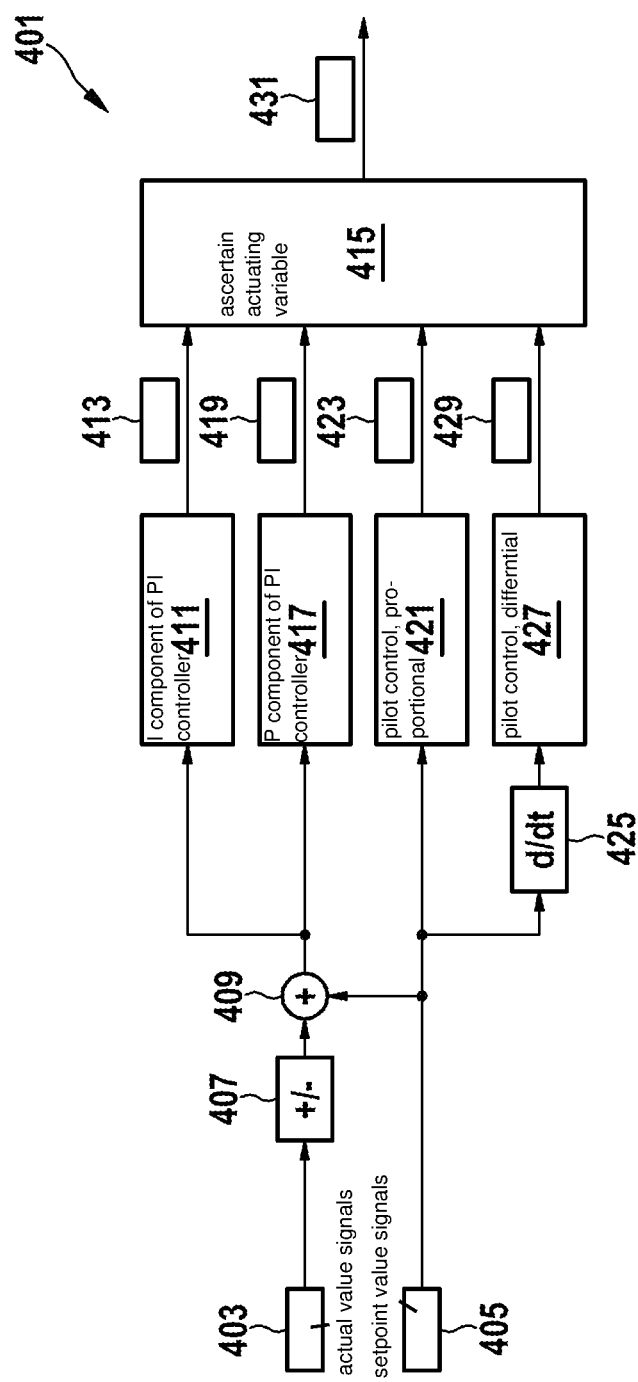
FIG. 4 shows a first block diagram, in accordance with an example embodiment of the present invention.

FIG. 4 shows a first block diagram 401 for regulating a kinematic variable of a motor vehicle.

It is provided that actual value signals 403 are received which represent an actual value of a kinematic variable of a motor vehicle.

It is further provided that setpoint value signals 405 are received which represent a setpoint value of the kinematic variable.

For example, the kinematic variable is a longitudinal acceleration of the motor vehicle.

A sign of the actual value is reversed in a function block 407.

The actual value having the reversed sign and the setpoint value are added in a function block 409.

This means that a control difference between the actual value and the setpoint value is ascertained in function block 409.

This control difference is provided to a function block 411.

Function block 411 corresponds to an I component of a PI controller.

This means that a partial actuating variable 413 is ascertained in function block 411 based on a time integration of the ascertained control difference.

Partial actuating variable 413 is then made available to a function block 415.

The control difference is further made available to a function block 417.

Function block 417 corresponds to a P component of a PI controller.

This means, in particular, that it is provided according to function block 417 that a partial actuating variable 419 is ascertained in such a way that it is proportional to the control difference.

This second partial actuating variable 419 is also made available to function block 415.

It is further provided that the setpoint value is made available to a function block 421.

Function block 421 corresponds to a proportional pilot control (pilot control, proportional).

According to this function block 421, it is provided that a third partial actuating variable 423 is ascertained in such a way that it is proportional to the setpoint value.

The third partial actuating variable is also made available to function block 415.

According to a function block 425, a first-order time derivation of the setpoint value is further ascertained. This means, in particular, that a variation of the setpoint value over time is ascertained.

The first-order time derivation of the setpoint value is made available to a function block 427.

Function block 427 corresponds to a differential pilot control (pilot control, differential).

According to function block 427, it is provided that a fourth partial actuating variable 429 is ascertained in such a way that, according to one specific embodiment, it is proportional to the first-order time derivation of the setpoint value.

Fourth partial actuating variable 429 is also made available to function block 415.

According to function block 415, a combination of the four partial actuating variables 413, 419, 423, 429 is provided to ascertain an actuating variable 431.

For example, according to one specific embodiment, actuating variable 431 is equal to the sum of the four partial actuating variables 413, 419, 423, 429.

According to one specific embodiment, more complex combination instructions are also provided, for example, to differently weight dynamizing and damping properties.

This means, in particular, that one or multiple or all of the four partial actuating variables 413, 419, 423, 429 may each be provided with a weighting factor.

First block diagram 401 according to FIG. 4 thus shows a PI controller having proportional and differential pilot control as a block diagram.

Figure 5:
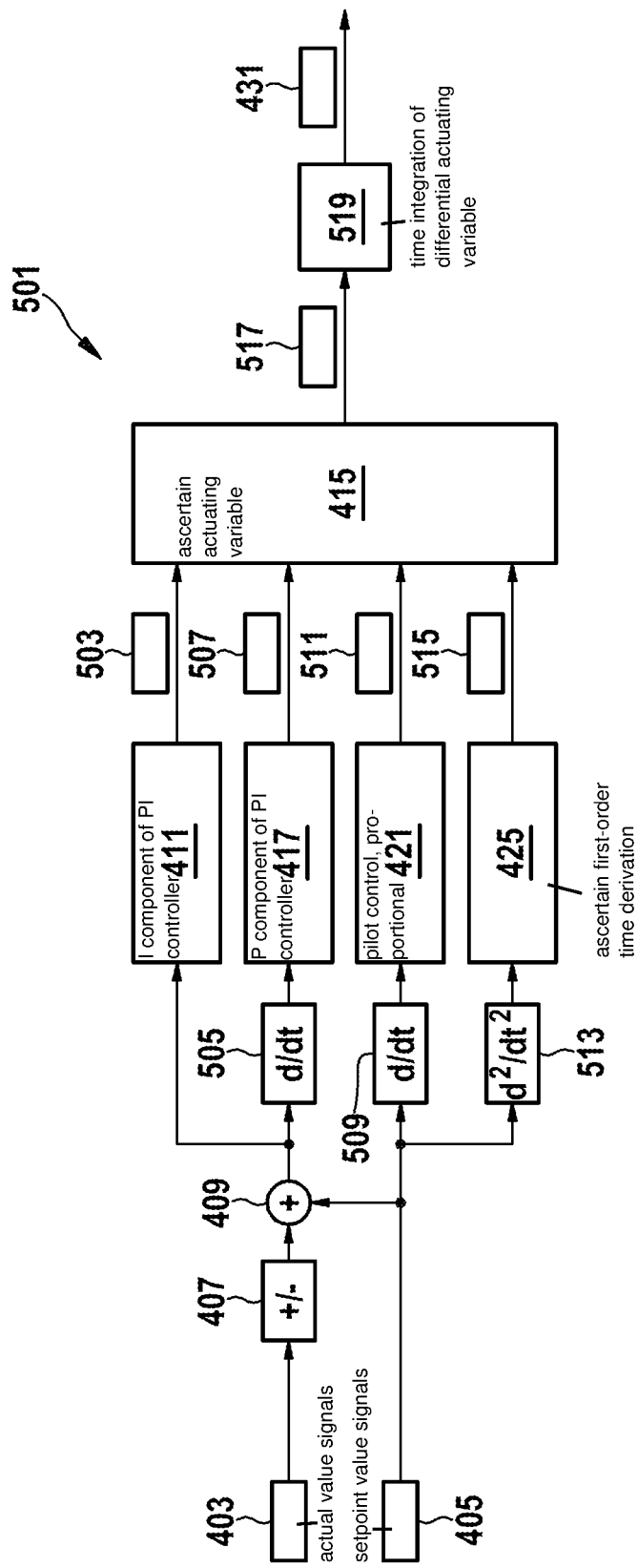
FIG. 5 shows a second block diagram, in accordance with an example embodiment of the present invention.

FIG. 5 shows a second block diagram 501 for regulating a kinematic variable of a motor vehicle.

It should be noted at this point that the elements having reference numerals 411, 417, 421, 425 and 415 according to second block diagram 501 according to FIG. 5 perform the same tasks in the particular context as the elements having reference numerals 411, 417, 421, 425 and 415 according to first block diagram 401 according to FIG. 4. According to one specific embodiment, however, these elements are not identical in each case.

Second block diagram 501 shows a PI controller including proportional and differential pilot control in a differential formulation.

Second block diagram 501 is based on first block diagram 401 according to FIG. 4.

Reference is hereby made to the corresponding discussion to avoid repetition. In addition, the same elements are provided with the same reference numerals.

The ascertained control difference is made available to function block 411 (I component).

In contrast to the first block diagram in FIG. 4, it is now provided in the differential formulation according to second block diagram 501 that a first differential partial actuating variable 503 is made available from function block 411 to function block 415.

The first differential partial actuating variable is based on the ascertained control difference, as carried out according to function block 411. In contrast to function block 411 according to FIG. 4, the I component (function block 411) does not have an integration in the differential formulation according to FIG. 5. The latter is only carried out in a function block 519 (see below).

A variation over time of the ascertained control difference is made available to function block 417 (P component).

This means that, according to a function block 505, it is provided that a variation over time of the ascertained control difference is ascertained.

According to function block 417, it is then provided that a second differential partial actuating variable 507 is ascertained in such a way that it is proportional to the ascertained variation over time of the control difference.

This second differential partial actuating variable is also made available to function block 415.

According to a function block 509, it is provided that a first-order time derivation of the setpoint value is further ascertained. This means that, according to function block 509, a variation of the setpoint value over time is ascertained.

This variation of the setpoint value over time is made available to function block 421 (pilot control, proportional).

According to function block 421, a third differential partial actuating variable is ascertained in such a way that it is proportional to the variation of the setpoint value over time.

Third differential partial actuating variable 511 is also made available to function block 415.

According to a function block 513, it is further provided that a variation over time of the variation of the setpoint value over time is ascertained.

This means that, according to function block 513, a second-order time derivation of the setpoint value is ascertained.

The second-order time derivation of the setpoint value is made available to function block 425 (pilot control, differential).

According to function block 425, a fourth differential partial actuating variable 515 is ascertained, for example in such a way that it is proportional to the second-order time derivation of the setpoint value.

This fourth differential partial actuating variable is also made available to function block 415.

According to function block 415, a combination of the four differential partial actuating variables 503, 507, 511 and 515 is carried out to ascertain a differential actuating variable 517.

For example, differential actuating variable 517 is the sum of the four differential partial actuating variables 503, 507, 511, 515.

Similarly to first block diagram 401 according to FIG. 4, the individual differential partial actuating variables 503, 507, 511, 515 may also each be provided with a weighting factor.

Differential actuating variable 517 is provided to function block 519.

According to function block 519, it is provided that a time integration of differential actuating variable 517 is carried out to ascertain actuating variable 431.

Figure 6:
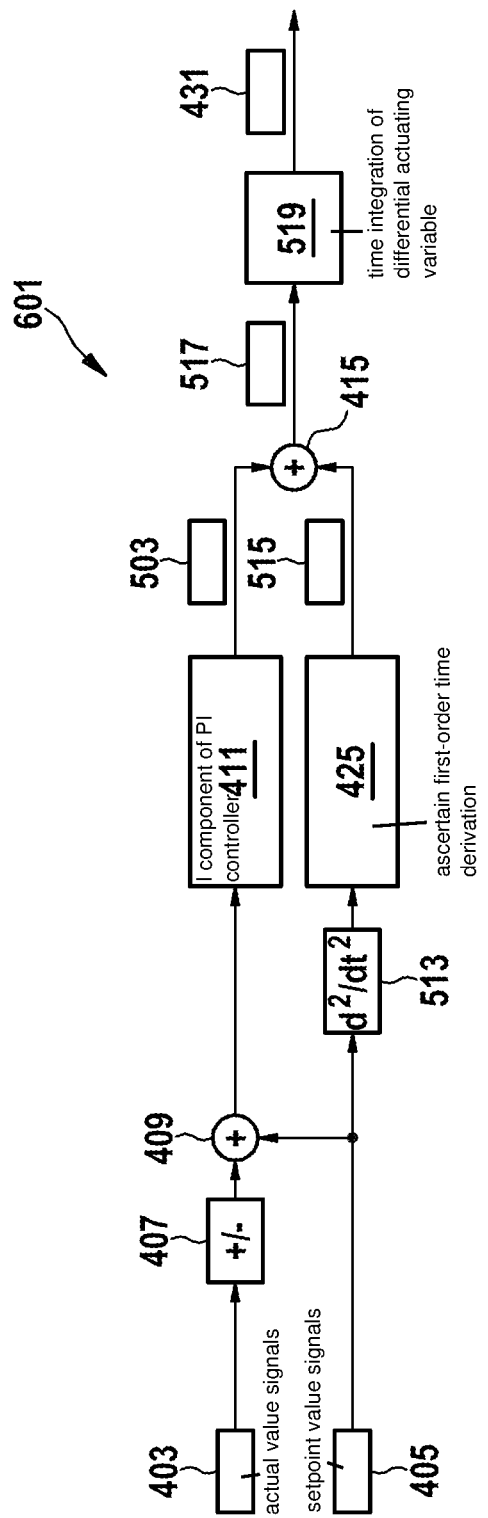
FIG. 6 shows a third block diagram, in accordance with an example embodiment of the present invention.

FIG. 6 shows a third block diagram 601 for regulating a kinematic variable of a motor vehicle.

Third block diagram 601 according to FIG. 6 is based on second block diagram 501 according to FIG. 5.

In contrast to second block diagram 501 according to FIG. 5, third block diagram 601 according to FIG. 6 now does not include function block 417 and function block 421.

According to function block 415, only an addition of the first differential partial actuating variable and fourth partial actuating variable 515 is further provided to ascertain differential variable 517.

Third block diagram 601 shows, for example, a longitudinal acceleration controller as the I controller including the differential pilot control in a differential formulation.

Figure 7:
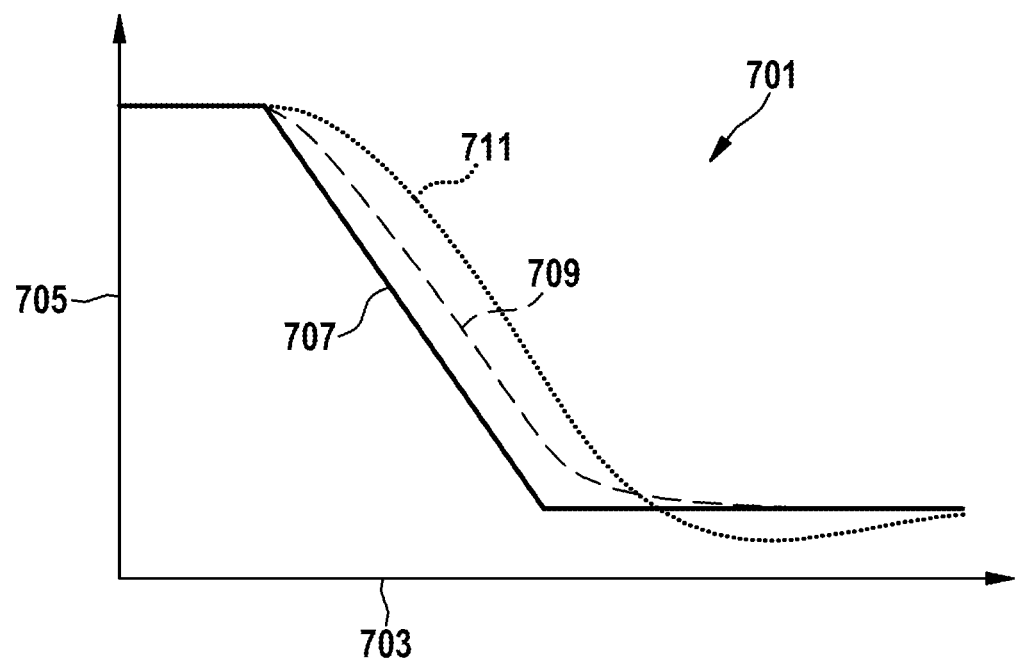
FIG. 7 shows a first graph, in accordance with an example embodiment of the present invention.

FIG. 7 shows a first graph 701.

An x axis of graph 701 is identified by reference numeral 703. X axis 703 indicates a time in random units.

A y axis of first graph 701 is identified by reference numeral 705.

Y axis 705 indicates an acceleration in random units.

Three curves 707, 709, 711 are plotted in graph 701, which are explained in greater detail below.

Figure 8:
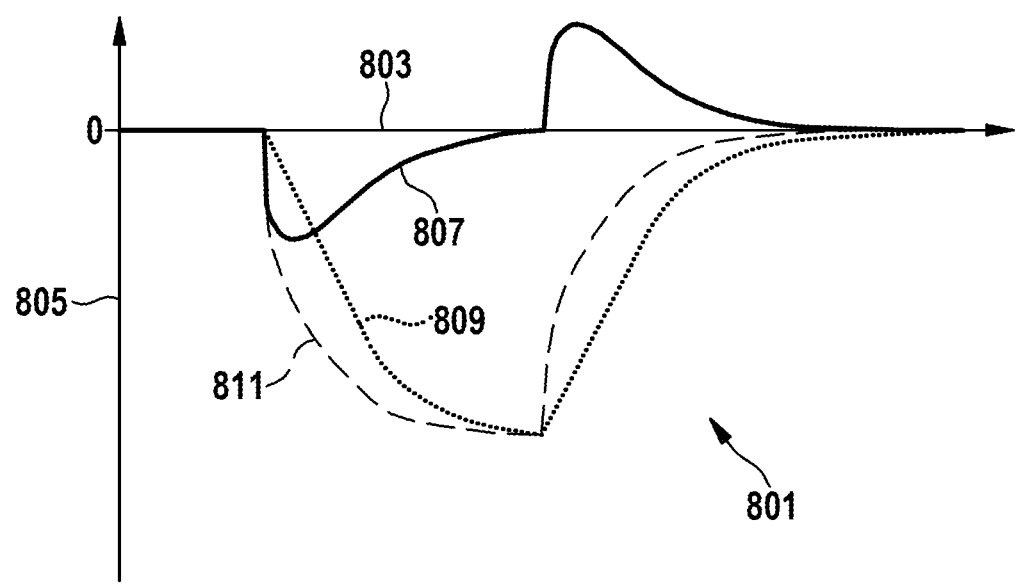
FIG. 8 shows a second graph, in accordance with an example embodiment of the present invention.

FIG. 8 shows a second graph 801.

An x axis of second graph 801 is identified by reference numeral 803. X axis 803 indicates a time in random units, but is synchronous with x axis 703 (time axis) according to FIG. 7.

A y axis of second graph 801 is identified by reference numeral 805.

Y axis 805 indicates a longitudinal force gradient in random units.

Three curves 807, 809 and 811 are plotted in graph 801, which are explained in greater detail below.

As explained above, the concept described here is based, in particular, on the fact that the second-order setpoint value subsequent behavior (curvature behavior) is improved by explicitly taking into account the variation of the setpoint value over time in the form of an additional contribution to the actuating variable. The controller stability and asymptotic adjustment behavior is advantageously not negatively affected.

In contrast to the P component, the actual value of the control variable (kinematic variable of the motor vehicle) is not incorporated into the calculation of the additional component, so that no increase in the interference and noise amplitudes to the actuating variable occurs.

According to one specific embodiment of the present invention, an additional component of a pilot control dependent on the gradient of the setpoint input, hereinafter referred to as the differential pilot control, is added to a PI controller. In contrast to the proportional pilot control, which is a direct function of the setpoint value ($S_{FFp}$=f [$x_{Tar}$]), the differential pilot control forms a partial actuating variable $S_{FFd}$=f [d/dt ($x_{Tar}$)] dependent on the time differential of setpoint value $x_{Tar}$ (cf. FIG. 4).

In the simplest case, this dependency may be a proportionality:

$$S_{FFd}=K_{FFd}*d/dt(x_{Tar})$$

having the associated amplification factor $K_{FFd}$.

To prevent discontinuities on the actuating variable in the case of an abrupt gradient change of the setpoint input (sharp bends), it is provided according to one specific embodiment to apply a suitable temporal filtering (e.g. PT1 filter) to actuating variable $S_{FFd}$.

Due to its differential nature, this component is suitable for compensating for a weakness in a controller design dominated by the I component: the sluggish 2nd-order subsequent behavior (curvature response).

Additional partial actuating variable $S_{FFd}$ from the differential pilot control is combined with the other controller components (cf. FIG. 4). In the simplest case, this combination may be an addition of all partial actuating variables:

$$S=S_I+S_P+S_{FFp}+S_{FFd}.$$

However, more complex combination instructions are also possible, for example, to differently weight dynamizing and damping properties.

The combination of the described controller design, made up of P and I components as well as proportional and differential pilot control, with the differential formulation of the overall controller is advantageous (cf. FIG. 5). Partial gradient actuating variables are calculated in the individual controller parts, which are initially combined to form differential total actuating variable dS/dt (abbreviated as "dS"). Actuating variable S is formed therefrom by time integration. Due to this differential representation, the different partial controllers may be connected and disconnected during active regulation, and their weighting and amplifications may be varied, without affecting the continuity of actuating variable S or its absolute value.

One application of the described controller in automotive engineering is longitudinal acceleration regulation for automated driving functions. Setpoint value $x_{Tar}$ at the controller input is constituted by target acceleration Ax target. Actuating variable S is represented by longitudinal force $F_x$, which is implemented by suitable actuators (brake, drive train) and effectuates an acceleration Ax-actual at the motor vehicle, which is made available to the controller as actual value $x_{Act}$, e.g., by evaluating wheel rotational speed and/or inertia sensor signals. In a differential formulation, actuating variable $F_x$ results due to the time integration of differential actuating variable d/dt($F_x$), the time gradient of the longitudinal force, dFx for short. The latter is made up of the different partial force gradients. In one exemplary specific embodiment, a controller of this type may be made up of an I component including partial actuating variable dFxI and a differential pilot control including partial actuating variable dFxFFd (cf. FIG. 6).

For illustrative purposes, FIG. 7 shows the simulated signal curves of a controller of this type according to FIG. 6 for a simple sample maneuver, a deceleration ramp (curve 707) and a simple system model (ground point, constant dead time). Actual value "Ax-actual" is plotted for the described combined controller (I and FFd component) (curve 709) as well as by comparison for a pure I controller (curve 711). The better subsequent behavior of the controller including the FFd component is apparent: The response to the sharp bend during the course of the variable takes place directly (faster curvature response). The dynamic behavior of the controller is improved thereby. However, the FFd component has a damping effect: While the pure I controller significantly undershoots during the adjustment to the stationary state (Ax target=const in the second part of the maneuver), the target level in the combined controller is asymptotically reached.

The differential partial actuating variables of the combined controller are illustrated in FIG. 8: I component dFxI (curve 809); differential pilot control dFxFFd (curve 807) and the sum of the two components (dFx total, curve 811). The FFd component accelerates the gradient change wherever the I component is naturally sluggish: during curvatures or sharp bends in the setpoint value. The stationary gradient is reached faster thereby, which is equivalent to a better subsequent behavior. At the beginning of the maneuver, this has a dynamizing effect (the deceleration is built up faster), the effect is damping in the second part (the deceleration buildup is reduced earlier).

In summary, FIG. 7 and FIG. 8 show signal curves of a sample maneuver for a controller according to FIG. 6.

FIG. 7: controller input, acceleration coordinate Ax;
  Ax target: target longitudinal acceleration (or deceleration) (curve 707);
  Ax actual: actual longitudinal acceleration (curves 709, 711);

FIG. 8: controller output, differential actuating variable: longitudinal force gradient dFx=d/dt (Fx) over time;
  dFxFFd: component of the longitudinal force gradient from the differential pilot control (curve 807);
  dFxI: component of the longitudinal force gradient from the I control ("integral component") (curve 809).

What is claimed is:

1. A method for regulating a kinematic variable of a motor vehicle, the method comprising:

receiving, via an input, actual value signals which represent an actual value of a kinematic variable of a motor vehicle;

receiving, via the input, setpoint value signals which represent a setpoint value of the kinematic variable;

ascertaining, via a processor, an actuating variable to be implemented by at least one actuating element of the motor vehicle, based on the actual value, the setpoint value and a variation of the setpoint value over time so that a deviation between the actual value and the setpoint value becomes smaller when the actuating variable is implemented using the at least one actuating element; and outputting, via an output, actuating variable signals, which represent the ascertained actuating variable;

wherein multiple partial actuating variables are ascertained in each case, based on the actual value, the setpoint value and the variation of the setpoint value over time, the multiple partial actuating variables being ascertained based on variations of the setpoint values over time, the actuating variable being ascertained based on the multiple partial actuating variables, wherein the actuating variable is equal to a sum of the multiple partial actuating variables, and wherein the at least one actuating element includes a plurality of actuating elements, and wherein each of the multiple partial actuating variables correspond to different ones of the plurality of the actuating elements.

2. The method as recited in claim 1, wherein a control difference between the actual value and the setpoint value is ascertained, one of the multiple partial actuating variables being ascertained based on a time integration of the ascertained control difference.

3. The method as recited in claim 1, wherein a control difference between the actual value and the setpoint value is ascertained, one of the multiple partial actuating variables being ascertained so that the one of the multiple partial actuating variables is proportional to the ascertained control difference.

4. The method as recited in claim 1, wherein one of the multiple partial actuating variables is ascertained so that the one of the multiple partial actuating variables is proportional to the setpoint value.

5. The method as recited in claim 1, wherein the actuating variable is ascertained based on a time integration of the differential actuating variable.

6. The method as recited in claim 5, wherein a control difference between the actual value and the setpoint value is ascertained, one of the multiple differential partial actuating variables being ascertained based on the ascertained control difference.

7. The method as recited in claim 5, wherein a variation over time of a control difference between the actual value and the setpoint value is ascertained, one of the multiple differential partial actuating variables being ascertained so that the one of the multiple differential partial actuating variables is proportional to the ascertained variation over time of the control difference.

8. The method as recited in claim 5, wherein one of the multiple differential partial actuating variables is ascertained so that the one of the multiple differential partial actuating variables is proportional to the variation of the setpoint value over time.

9. The method as recited in claim 5, wherein a variation over time of the variation of the setpoint value over time is ascertained, one of the multiple differential partial actuating variables being ascertained based on the ascertained variation over time of the variation of the setpoint value over time, wherein the ascertained variation over time of the variation of the setpoint value over time is a second-order time derivation.

10. The method as recited in claim 1, wherein the at least one actuating element includes an actuating element of a drive system, or a clutch system, or a steering system, or a braking system of the motor vehicle.

11. The method as recited in claim 1, wherein the variation of the setpoint value over time is a first-order time derivation.

12. The method as recited in claim 1, wherein the actuating variable includes a transverse force or a longitudinal force, which is applied or is to be applied by the at least one actuating element, and effectuates a transverse acceleration or a longitudinal acceleration of the vehicle.

13. The method as recited in claim 1, wherein a sign of the actual value is reversed in a first function block, and wherein the actual value having the reversed sign and the setpoint value are added in a second function block, so that a control difference between the actual value and the setpoint value is ascertained in the second function block.

14. The method as recited in claim 13, wherein the control difference is provided to a third function block, which corresponds to an I component of a PI controller, so that a partial actuating variable is ascertained in the third function block based on a time integration of the ascertained control difference.

15. The method as recited in claim 1, wherein a control difference is provided to a third function block, which corresponds to an I component of a PI controller, so that a partial actuating variable is ascertained in the third function block based on a time integration of the ascertained control difference.

16. The method as recited in claim 1, wherein a first partial actuating variable is ascertained based on a time integration of the ascertained control difference.

17. The method as recited in claim 16, wherein a second partial actuating variable is ascertained so that it is proportional to the control difference.

18. The method as recited in claim 17, wherein a third partial actuating variable is ascertained so that it is proportional to the setpoint value.

19. The method as recited in claim 18, wherein a fourth partial actuating variable is ascertained so that it is proportional to the first-order time derivation of the setpoint value.

20. The method as recited in claim 19, wherein a combination of the four partial actuating variables is provided to ascertain the actuating variable.

21. An apparatus for regulating a kinematic variable of a motor vehicle, comprising:

a device configured to perform the following:

receiving actual value signals which represent an actual value of a kinematic variable of a motor vehicle;

receiving setpoint value signals which represent a setpoint value of the kinematic variable;

ascertaining an actuating variable to be implemented by at least one actuating element of the motor vehicle, based on the actual value, the setpoint value and a variation of the setpoint value over time so that a deviation between the actual value and the setpoint value becomes smaller when the actuating variable is implemented using the at least one actuating element; and outputting actuating variable signals, which represent the ascertained actuating variable;

wherein multiple partial actuating variables are ascertained in each case, based on the actual value, the setpoint value and the variation of the setpoint value over time, at least one of the multiple partial actuating variables being ascertained based on variations of the setpoint values over time, the actuating variable being ascertained based on the multiple partial actuating variables, wherein the actuating variable is equal to a sum of the multiple partial actuating variables, and wherein the at least one actuating element includes a plurality of actuating elements, and wherein each of the multiple partial actuating variables correspond to different ones of the plurality of the actuating elements.

22. A non-transitory machine-readable memory medium, on which is stored a computer program, which is executable by a processor, comprising:

a program code arrangement having program code for regulating a kinematic variable of a motor vehicle, by performing the following:

receiving actual value signals which represent an actual value of a kinematic variable of a motor vehicle;

receiving setpoint value signals which represent a setpoint value of the kinematic variable;

ascertaining an actuating variable to be implemented by at least one actuating element of the motor vehicle, based on the actual value, the setpoint value and a variation of the setpoint value over time so that a deviation between the actual value and the setpoint value becomes smaller when the actuating variable is implemented using the at least one actuating element; and outputting actuating variable signals, which represent the ascertained actuating variable;

wherein multiple partial actuating variables are ascertained in each case, based on the actual value, the setpoint value and the variation of the setpoint value over time, at least one of the multiple partial actuating variables being ascertained based on variations of the setpoint values over time, the actuating variable being ascertained based on the multiple partial actuating variables, wherein the actuating variable is equal to a sum of the multiple partial actuating variables, and wherein the at least one actuating element includes a plurality of actuating elements, and wherein each of the multiple partial actuating variables correspond to different ones of the plurality of the actuating elements.

\* \* \* \* \*